United States Patent [19]

Murphy

[11] Patent Number: 5,591,702
[45] Date of Patent: Jan. 7, 1997

[54] STRIPPING COMPOSITIONS WITH MIXTURES OR ORGANIC SOLVENTS AND USES THEREOF

[75] Inventor: Donald P. Murphy, Rochester Hills, Mich.

[73] Assignee: Henkel Corporation, Plymouth Meeting, Pa.

[21] Appl. No.: 450,593

[22] Filed: May 25, 1995

[51] Int. Cl.$^6$ .................. C11D 3/26; C11D 3/20
[52] U.S. Cl. .............. 510/202; 510/203; 510/206; 510/207; 510/407
[58] Field of Search ................. 252/158, 170, 252/174.14, 139, DIG. 8, 548

[56] References Cited

U.S. PATENT DOCUMENTS

| | | | |
|---|---|---|---|
| H468 | 5/1988 | Malik et al. | 252/542 |
| 1,812,321 | 6/1931 | Davidson | 252/170 |
| 3,308,066 | 3/1967 | Murphy et al. | 252/158 |
| 3,553,144 | 1/1971 | Murphy | 252/158 |
| 3,615,827 | 10/1971 | Murphy | 134/38 |
| 3,663,447 | 5/1972 | Murphy | 252/156 |
| 3,663,476 | 5/1972 | Murphy | 252/529 |
| 3,671,465 | 6/1972 | Murphy | 252/548 |
| 3,679,609 | 7/1972 | Castner | 252/527 |
| 3,681,250 | 8/1972 | Murphy | 252/158 |
| 3,766,076 | 10/1973 | Murphy | 252/156 |
| 3,832,305 | 8/1974 | Murphy | 252/158 |
| 3,847,839 | 11/1974 | Murphy et al. | 252/544 |
| 3,882,038 | 5/1975 | Clayton et al. | 252/164 |
| 3,931,033 | 1/1976 | Lohr et al. | 252/122 |
| 4,435,305 | 3/1984 | Tsoukalas et al. | 252/158 |
| 4,537,705 | 8/1985 | Mahoney et al. | 252/529 |
| 4,822,723 | 4/1989 | Dhillon | 430/331 |
| 4,861,518 | 8/1989 | Morganson et al. | 252/548 |
| 4,921,629 | 5/1990 | Mahili et al. | 252/170 |
| 5,006,279 | 4/1991 | Grobbel et al. | 252/542 |
| 5,342,551 | 8/1994 | Ruckle | 252/548 |
| 5,364,551 | 11/1994 | Lentsch et al. | 252/156 |
| 5,380,454 | 1/1995 | Griepenburg et al. | 252/174.14 |
| 5,474,710 | 12/1995 | Ofosn-Asanta et al. | 252/352 |

FOREIGN PATENT DOCUMENTS

| | | |
|---|---|---|
| 423635 | 4/1991 | European Pat. Off. |
| 223734 | 6/1985 | Germany. |
| 108092 | 4/1994 | Japan. |
| 2067588 | 7/1981 | United Kingdom. |

Primary Examiner—Paul Lieberman
Assistant Examiner—Michael Tierney
Attorney, Agent, or Firm—Ernest B. Szoke; Wayne C. Jaeschke; Norvell E. Wisdom, Jr.

[57] ABSTRACT

Solvent assisted alkaline paint stripping can be speeded by using mixtures of (i) glycol and/or oligoglycol monoethers with (ii) unetherified glycols and oligoglycols and/or alkanolamines.

20 Claims, No Drawings

STRIPPING COMPOSITIONS WITH MIXTURES OR ORGANIC SOLVENTS AND USES THEREOF

BACKGROUND OF THE INVENTION

1. Field of the Invention

This invention relates to compositions and processes for removing organic coatings, particularly paints and the like, from metal surfaces bearing such organic coatings, especially when the metal surfaces have been conversion coated, as with phosphate or chromate coatings, before being given an organic coating. Compositions that are effective in removing organic coatings in this way are often called "stripping compositions" or simply "strippers" and may be so denoted hereinafter. The compositions are at least partially aqueous and alkaline but also contain organic solvents, which may or may not be completely soluble in the aqueous part of the compositions. Additional details may be found in U.S. Pat. No. 3,308,066 of Mar. 7, 1967 to Murphy et al., the entire disclosure of which, except to the extent that it may be inconsistent with any explicit statement herein, is hereby incorporated herein by reference.

More particularly, this invention is concerned with compositions which include at least two chemically distinct types of organic solvents that act synergistically to achieve more rapid stripping than would be expected from the weighted average of stripping times of their individual components. In some of its embodiments, this invention is concerned with alkaline stripping compositions that eliminate or at least substantially reduce the potential for air pollution by excluding or substantially reducing any content of organic solvents recognized as significant contributors to air pollution when evaporated into the air, for example, any solvents listed as Hazardous Air Pollutants under the U. S. Clean Air Act.

2. Discussion of Related Art

Previously known alkaline stripping compositions are diverse, but the most effective previously known ones generally include ethylene glycol, one of the materials often known as "poly-[or oligo-]ethylene glycols" because the molecules thereof can be at least formally derived from two or more molecules of ethylene glycol by loss of one water molecule between each pair of ethylene glycol molecules to form an ether bond between the two molecules that replaces the —OH group formerly present in each molecule, and/or monoethers of ethylene glycol and/or its oligomers as defined above. Most if not all such materials have been implicated as significant sources of air pollution and are likely to be legally banned or severely restricted in use in the United States within the next few years.

DESCRIPTION OF THE INVENTION

OBJECTS OF THE INVENTION

One major object of the invention is to provide compositions and processes that avoid using significant sources of air pollution while achieving adequate stripping capability compared with the established strippers using derivatives of ethylene glycol as noted above. Another alternative or concurrent object is to provide compositions containing at least two chemically distinct types of organic solvents that are more effective in stripping together than alone.

GENERAL PRINCIPLES OF DESCRIPTION

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, fraction of, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the stated objects of the invention); and the term "mole" and its variations may be applied to elemental, ionic, and any other chemical species defined by number and type of atoms present, as well as to compounds with well defined molecules.

SUMMARY OF THE INVENTION

Compositions according to the invention may be working compositions suitable for direct use in stripping processes or concentrates, which contain some or all of the active ingredients of working compositions and are suitable for preparing working compositions thereof by dilution with water and/or mixing with other concentrates. Working compositions according to the invention comprise, preferably consist essentially of, or more preferably consist of, water and the following components:

(A) at least one dissolved alkali or alkaline earth metal hydroxide;

(B) at least one compound that is liquid at 25° C. under normal atmospheric pressure and is selected from the group consisting of monoethers of (i) ethylene glycol, (ii) propylene glycol, (iii) butylene glycol, and (iv) "oligomers" as defined above of ethylene glycol, propylene glycol, and butylene glycol; and (C) at least one compound that is liquid at 25° C. under normal atmospheric pressure and is selected from the group consisting of (i) ethylene glycol, (ii) propylene glycol, (iii) butylene glycol, (iv) "oligomers" as defined above of ethylene glycol, propylene glycol, and butylene glycol, and (v) mono-, di-, and tri-alkanol amines; and, optionally, one or more of the following components:

(D) a component selected from the group consisting of gluconic acid, water soluble and water dispersible salts of gluconic acid, heptogluconic acid and its water soluble and water dispersible salts, and glucono-delta-lactone;

(E) surfactant (alternatively described as "wetting agent"); and (F) alkaline salts exclusive of alkali metal and alkaline earth metal hydroxides.

Processes of utilizing working compositions according to the invention as defined above for stripping paint and like materials from metal surfaces are another embodiment of the invention.

DESCRIPTION OF PREFERRED EMBODIMENTS

It is normally preferred that compositions according to the invention as defined above should be substantially free from various ingredients. Specifically, it is increasingly preferred in the order given, independently for each preferably minimized component listed below, that primary compositions according to the invention, when directly contacted with coatings on metal in a process according to this invention, contain no more than 10, 5, 3, 2.0, 1.0, 0.35, 0.10, 0.08, 0.04, 0.02, 0.01, 0.001, or 0.0002 percent of any of (i) hydrocarbons; (ii) any other compounds identified as carcinogenic; and (iii) any compound other than water that is not a hydrocarbon with a vapor pressure at 100° C. that exceeds, with increasing preference in the order given, 500, 300, 200, 100, 70, 50, 30, 15, 10, 7, 5, 3, 1.5, or 0.7 millibars.

The alkali metal or alkaline earth metal hydroxide component (A) according to the invention preferably is selected from sodium and potassium hydroxide for a combination of economic and technical reasons. Sodium hydroxide is generally the least expensive among all the suitable hydroxides, and would normally be favored for that reason. However, potassium cations are compatible with larger concentrations of organic solvents in an aqueous phase than are sodium cations, and potassium hydroxide is not prohibitively expensive, so that when speed of stripping is more important than minimum cost of the stripping compositions, potassium is preferred because it can be used in higher concentrations that favor faster stripping. Lithium and alkaline earth cations are even less compatible with organic cosolutes than sodium and usually are not preferred for that reason, although workable at low concentrations. Rubidium and cesium hydroxides are expected to be highly effective in compositions according to the invention but are too expensive for ordinary use.

The concentration of component (A) in a working composition according to the invention may vary over quite wide limits. Generally, faster stripping will be achieved with higher concentrations of component (A), with all other factors equal. Thus, concentrations up to the solubility limit of the particular hydroxide used could be workable in various circumstances. However, very high concentrations of hydroxides may reduce the solubility of components (B) and (C) in the aqueous phase so much that stripping will actually be impeded. Generally, the concentration of component (A) preferably is, with increasing preference in the order given, at least 0.1, 0.3, 0.5, or 0.8 gram moles per kilogram (hereinafter usually abbreviated "M/kg"), and for removing difficult paints or similar coatings on alkali resistant metal surfaces still more preferably is, with increasing preference in the order given, at least 1.1, 1.4, 1.7, 2.0, 2.2, 2.4, 2.6, 2.7, 2.8, 2.9, or 3.0 M/kg of total working composition. Independently, in most circumstances the concentration of component (A) in a working composition according to the invention preferably is, with increasing preference in the order given, not more than 10, 8, 6, or 5 M/kg of total working composition and for one preferred embodiment still more preferably is not more than 4.5, 4.1, 3.8, 3.6, 3.5, 3.3, 3.2, or 3.1 M/kg of total working composition.

The total of components (B) and (C) in working compositions according to this invention preferably is, with increasing preference in the order given, at least 1, 3, 5, 7, 9, 10, 11, 12, 13, 14, or 15.0 percent and independently preferably is, with increasing preference in the order given, less than or equal to 50, 40, 30, 25, 22, 20, 19, 18, 17, 16.0, or 15.5 percent.

The glycol unit residues in components (B) and (C) as described above preferably are those of ethylene or propylene glycol. Propylene glycols and oligomers thereof with either or both of 1,2- or 1,3-propanediol structure or residues therefrom may be used, but molecules with the 1,2 substituted structure are usually preferred because they are usually less expensive. Independently, the molecules of component (B) preferably: either contain at least two glycol residues each or contain one glycol residue and a total of at least 5 carbon and oxygen atoms in their etherifying moiety; independently preferably contain, with increasing preference in the order given, at least 4, 5, 6, or 7 carbon atoms each, and independently preferably contain, with increasing preference in the order given, not more than 14, 12, 11, or 10 carbon atoms each. The glycols, glycol residues, and/or etherifying moieties in the molecules of components (B) and (C) may be straight or branched aliphatic, cycloaliphatic, aromatic, or heterocyclic and may include unsaturation and substituent groups such as ether groups and halogens that do not substantially diminish paint stripping ability. Normally, however, primarily for reasons of economy, unsubstituted aliphatic glycols, glycol ethers, and etherifying moieties are preferred.

An important characteristic of many preferred embodiments of the invention is the existence of a synergistic effect, as defined below, between components (B) and (C). A synergistic effect for the purposes of this description is defined to exist whenever a composition according to this invention is found to strip paint more rapidly than would be expected from the weighted average of the stripping times of comparison compositions in which only component (B) or component (C) alone is used, with other constituents and physical conditions being kept constant. In mathematical terms, if (i) component (B) is present in the composition in a fraction "b" parts by weight of the total "t" parts by weight of components (B) and (C), (ii) the stripping time for a constant type and thickness of organic coating to be stripped from a constant metal substrate at a constant temperature by a composition containing t parts of component (B) and no component (C) is denoted as "$S_b$" and the stripping time under the same conditions, except for using a composition containing t parts of component (C) and no component (B) is denoted as "$S_c$", then the weighted average expected stripping time, "W", for the composition containing both components (B) and (C) is defined as follows:

$$W = b \cdot S_b + (1-b) \cdot S_c.$$

The "percent synergy" of the actual stripping time "$S_{(b+c)}$" is defined to equal $[100(W-S_{(b+c)})/W]$. If this value is negative, the percentage is defined to represent "antisynergy", because the mixture strips more slowly than would be expected from its individual constituents. Compositions according to this invention that have types and amounts of components (B) and (C) that have a positive percent synergy for stripping at least one type of organic coating from metal under at least one set of physical conditions are preferred embodiments of this invention, with compositions including combinations with higher positive percent synergy values increasingly more preferred.

Several specific preferred combinations for components (B) and (C) have been discovered for specific examples of components (B) and (C) identified by the following abbreviations: DEGMPE=diethylene glycol monopropyl ether; PG=propylene glycol; DPG=dipropylene glycol; TPG= tripropylene glycol; MEA=monoethanolamine; DEGMnBE=diethylene glycol monon-butyl ether; TEGMME=triethylene glycol monomethyl ether; TEGMEE=triethylene glycol monoethyl ether; TEGMnBE=triethylene glycol monon-butyl ether; DPGMPE=dipropylene glycol monopropyl ether; DPGMnBE=dipropylene glycol monon-butyl ether; TPGMnBE=tripropylene glycol monon-butyl ether; DPGMtBE=dipropylene glycol monot-butyl ether; EGMFE=ethylene glycol monofurfuryl ether; DEGMHE= diethylene glycol monohexyl ether; TPGMME=tripropylene glycol monomethyl ether; DPGMME=dipropylene glycol monomethyl ether. Some preferred combinations are:

EGMFE and TPG, with a fraction of TPG that preferably is at least, with increasing preference in the order given, 0.40, 0.50, 0.60, 0.70, or 0.80 and independently preferably is, with increasing preference in the order given, less than or equal to 0.95.0.90, 0.85, or 0.81;

DEGMPE and MEA, with a fraction of MEA that preferably is at least, with increasing preference in the order given, 0.10, 0.20, 0.30, 0.40, 0.50, or 0.55 and that independently preferably is less than or equal to, with increasing preference in the order given, 0.90, 0.80, 0.70, or 0.65;

DEGMPE and PG, with a fraction of PG that preferably is, with increasing preference in the order given, at least 0.50, 0.55, or 0.59 and independently preferably is, with increasing preference in the order given, less than or equal to, with increasing preference in the order given, 0.75, 0.65, or 0.61;

DEGMPE and DPG, with a fraction of DPG that preferably is, with increasing preference in the order given, at least 0.10, 0.19, and 0.39 and independently preferably is, with increasing preference in the order given, less than or equal to 0.90, 0.85, or 0.81;

TEGMME and MEA, with a fraction of MEA that preferably is, with increasing preference in the order given, at least 0.40, 0.45, 0.50, 0.55, or 0.60 and independently preferably is, with increasing preference in the order given, less than or equal to 0.80, 0.70, 0.65, or 0.61;

TEGMME and PG, with a fraction of PG that preferably is, with increasing preference in the order given, at least 0.15, 0.20, 0.30, or 0.39 and independently preferably is, with increasing preference in the order given, less than or equal to 0.80, 0.70, 0.65, or 0.60;

TEGMME and DPG, with a fraction of DPG that preferably is, with increasing preference in the order given, at least 0.35, 0.55, or 0.60 and independently preferably is, with increasing preference in the order given, less than or equal to 0.95, 0.90, 0.85, or 0.81;

DPGMME and PG, with a fraction of DPG that preferably is at least, with increasing preference in the order given, 0.05, 0.10, 0.15, or 0.20 and independently preferably is less than or equal to, with increasing preference in the order given, 0.90, 0.85, or 0.81 and in more weakly alkaline solutions still more preferably is, with increasing preference in the order given, less than or equal to 0.55, 0.41, 0.35, 0.30, 0.25, or 0.21;

DPGMME and DPG, with a fraction of DPG that preferably is, with increasing preference in the order given, at least 0.10, 0.15, or 0.20 and for removing paint less than or equal to 50 microns thick more preferably is, with increasing preference in the order given, less than or equal to 0.30, 0.40, 0.50, 0.60, 0.70, or 0.79 and independently preferably is, with increasing preference in the order given, less than or equal to 0.90, 0.85, or 0.81;

DPGMME and TPG, with a fraction of TPG that preferably is, with increasing preference in the order given, at least 0.25, 0.35, or 0.40 and in relatively weakly alkaline compositions at least 0.55 or 0.60 and independently preferably is, with increasing preference in the order given, less than or equal to 0.90, 0.85, or 0.81;

DEGMnBE and MEA, with a fraction of MEA that preferably is, with increasing preference in the order given, at least 0.15, 0.20, or 0.58 and independently preferably is, with increasing preference in the order given, less than or equal to 0.90, 0.85, 0.80, 0.70, or 0.61;

DEGMnBE and PG, with a fraction of PG that preferably is, with increasing preference in the order given, at least 0.20, 0.30, 0.35, or 0.40 and independently preferably is, with increasing preference in the order given, less than or equal to 0.90, 0.80, 0.70, or 0.62;

DEGMnBE and DPG, with a fraction of DPG that preferably is, with increasing preference in the order given, at least 0.50, 0.55, or 0.60 and independently preferably is, with increasing preference in the order given, less than or equal to 0.95, 0.90, 0.85, or 0.81;

TEGMEE and MEA, with a fraction of MEA that preferably is, with increasing preference in the order given, at least 0.12, 0.18, or 0.38 and independently preferably is, with increasing preference in the order given, less than or equal to 0.80, 0.60, 0.55, 0.50, 0.45, or 0.41;

TEGMEE and PG, with a fraction of PG that preferably either (i) is at least, with increasing preference in the order given, 0.10, 0.15, or 0.20 and independently preferably is, with increasing preference in the order given, not more than 0.45, 0.40, 0.35, 0.30, or 0.25 or (ii) is at least, with increasing preference in the order given, 0.50, 0.55, or 0.60 and independently preferably is, with increasing preference in the order given, less than or equal to 0.90, 0.85, 0.80, 0.75, 0.70, or 0.65;

TEGMEE and DPG, with a fraction of DPG that preferably is, with increasing preference in the order given, at least 0.10, 0.15, or 0.20 and independently preferably is, with increasing preference in the order given, less than or equal to 0.95, 0.90, 0.85, 0.80, 0.75, 0.70, 0.65, or 0.61;

TEGMEE and TPG, with a fraction of TPG that preferably is, with increasing preference in the order given, at least 0.10, 0.15, 0.18, or 0.19 and independently preferably is, with increasing preference in the order given, less than or equal to 0.90, 0.85, 0.81, 0.71, 0.55, 0.40, or 0.21;

DEGMHE and DPG, with a fraction of DPG that preferably is, with increasing preference in the order given, at least 0.20, 0.30, 0.35, or 0.39 and independently preferably is, with increasing preference in the order given, less than or equal to 0.81, 0.61, 0.50, 0.46, or 0.41;

TEGMnBE and MEA, with a fraction of MEA that preferably is, with increasing preference in the order given, at least 0.45, 0.50, 0.55, or 0.59 and independently preferably is, with increasing preference in the order given, less than or equal to 0.90, 0.81, 0.71, 0.66, or 0.61;

TEGMnBE and PG, with a fraction of PG that preferably is, with increasing preference in the order given, at least 0.45, 0.50, 0.55, or 0.59 and independently preferably is, with increasing preference in the order given, less than or equal to 0.90, 0.85, or 0.81;

TEGMnBE and DPG, with a fraction of DPG that preferably is, with increasing preference in the order given, at least 0.10, 0.15, 0.20, 0.30, or 0.40 and independently preferably is, with increasing preference in the order given, less than or equal to 0.81, 0.70, or 0.61;

TPGMME and DPG, with a fraction of DPG that preferably is, with increasing preference in the order given, at least 0.20, 0.40, 0.50, 0.60, 0.70, or 0.80 and independently preferably is, with increasing preference in the order given, less than or equal to 0.95, 0.90, 0.85, or 0.81; and TPGMME and TPG, preferably with a fraction of TPG that is, with increasing preference in the order given, at least 0.50, 0.60, 0.70, or 0.80 and independently preferably is, with increasing preference in the order given, less than or equal to 0.95, 0.90, 0.85, or 0.81.

The above-noted preferred combinations of components (B) and (C) preferably are used as such, and not in mixtures among themselves. These preferred combinations may be formulated as concentrates according to the invention, in compositions containing no other essential ingredients, suitable for adding to any of the well established alkaline stripping agents for paint and the like. These combinations, with the same relative proportions among components (B) and (C), may also advantageously be used in complete concentrates, also containing water and component (A), which are suitable for use as working compositions after dilution with water only, or in working compositions according to the invention and processes of stripping coatings from metals therewith.

When both of components (B) and (C) contain at least six carbon atoms per molecule, there may be phase separation problems in complete concentrates if only the most preferred constituents as outlined above are used in the complete concentrates. If such phase separation problems are encountered, they may often be overcome by adding a third component, usually ethylene glycol or propylene glycol. For example, when the above noted preferred combination of TPGMME for component (B) and DPG for component (B) is used, a ratio of dipropylene glycol to propylene glycol in a working composition that preferably is, with increasing preference in the order given, not less than or equal to 1.0, 1.5, 2.0, 2.3, 2.6, 2.8, 2.9, 3.0, 3.1, or 3.15 and independently preferably is, with increasing preference in the order given, not more than 50, 25, 15, 10, 7.5, 5.0, 4.5, 4.2, 3.9, 3.7, 3.6, 3.5, 3.4, 3.3, or 3.25 has been found to yield exceptionally favorable results in a preferred complete concentrate according to the invention that contains potassium hydroxide as component (A).

Optional component (D) is believed to have at least two possibly favorable effects on working compositions according to the invention: mutual solubilization of hydroxide and the organic components and an ability to attack phosphate conversion coatings which often underlie the paint or similar coating to be stripped and thereby to speed the stripping process by undermining the bond between the paint film to be removed and the underlying metal. It is accordingly preferred in most such working compositions that the concentration of component (D) in a working composition according to this invention is, with increasing preference in the order given, not less than or equal to 0.01, 0.03, 0.05, 0.07, 0.09, 0.11, 0.13, 0.15, 0.16, 0.17, 0.18, 0.19, or 0.20 M/kg of total composition and independently preferably is, with increasing preference in the order given, not more than 2.0, 1.5, 1.0, 0.8, 0.6, 0.50, 0.45, 0.40, 0.37, 0.34, 0.31, 0.29, 0.27, 0.25, 0.24, 0.23, 0.22, or 0.21 M/kg of total composition. The most preferred chemical compound for use in preparing compositions according to the invention to provide component (D) is gluconic acid, although it is expected to be present in salt form in the highly alkaline working compositions.

Component (E) of surfactant or wetting agent is not generally needed, but may be useful in some cases for removing coatings that have an extraordinarily hydrophobic surface. Component (F) of alkaline salts other than hydroxides also is generally not needed, but may be advantageous in cases where the amount of component (A) is lower than is normally preferred, in order to protect the underlying metal surface from alkaline attack.

Speed of stripping is normally substantially increased at higher temperatures. Therefore, it is normally preferred that the temperature of working compositions when in actual contact with coatings to be stripped be maintained at a temperature of at least, with increasing preference in the order given, 75, 80, 85, 90, 92, 94, 95, 96, 97, 98, 99, 100, 101, 102, 103, or 104° C., or at the boiling temperature of the working composition if that is higher. It is preferred that the working composition separate into two liquid phases at working temperatures, as this has been found to promote stripping action. However, the solubility of organic compounds in alkaline aqueous ionic solutions is often greater at lower temperatures, so that a preferred composition may form a single phase at normal ambient temperatures, i.e., 15°–25° C.

The invention may be further appreciated by consideration of the following examples and comparative examples.

Preparation of Test Substrates

Cold rolled steel sheets were first normally cleaned and activated and then either (i) phosphate conversion coated with BONDERITE® 1000 iron phosphate conversion coating forming composition and then painted with a thickness of about 20 micrometers (hereinafter usually abbreviated "μm") of DURACRON™ 200 acrylic appliance paint (denoted type "A" below) or (ii) phosphate conversion coated with BONDERITE® 952 zinc-manganese-nickel phosphate conversion coating forming composition and then painted with a thickness of about 56 μm of DURACRON™ 200 paint (denoted type "B" below).

Preparation of Working Compositions for Testing—Group 1

The working stripping compositions (not all of which are necessarily according to the invention) were prepared from two concentrates: An aqueous alkaline concentrate consisting of 46% potassium hydroxide, 8% of a solution of 50% of gluconic acid in water, and 46% of water and an organic additive concentrate with component(s) as shown in Table 1 below. The amount of the organic additive was 15% of each working composition in Table 1, the amount of the alkaline concentrate is listed in Table 1, and the balance of the working compositions was tap water. The working compositions were maintained at boiling temperature and normal ambient atmospheric pressure during the testing, with water replenishment as needed to maintain the original volume. (The boiling temperature is about 104° C. for compositions that contained 30% of the alkaline concentrate and is about 109° C. for compositions that contained 50% of the alkaline concentrate. All of the organic additives tested have boiling points so much higher than water that replenishing them was not needed to maintain substantially constant composition.)

Painted, pre-phosphated test panels prepared as described above were immersed in the working compositions and observed until the paint had been completely stripped, or, in a few cases, until a preset time limit had been exceeded. The time required for stripping was then taken from a timing device that had been started at the time of immersion; if stripping was not achieved, the time limit is shown instead, following a ">" sign in the tables below.

Results are shown in Table 1 below, along with some comparative tests with numbers beginning with "C" in which a single organic compound is used in the working composition and a few comparative examples in which two types of (oligo-)glycol ethers are mixed.

TABLE 1

| Test No. | Organic Additive Composition | % AC in WC | Panel Type A ST | % S | Panel Type B ST | % S |
|---|---|---|---|---|---|---|
| C-12 | 100% EGMFE | 30 | 4.0 | — | 6.0 | — |
| 129 | 80% EGMFE + 20% TPG | 30 | 6.5 | −35 | 10.9 | −49 |
| 130 | 60% EGMFE + 40% TPG | 30 | 4.2 | 25 | 8.7 | −1 |
| 131 | 40% EGMFE + 60% TPG | 30 | 4.0 | 38 | 7.5 | 24 |
| 132 | 20% EGMFE + 80% TPG | 30 | 3.5 | 51 | 7.2 | 36 |
| C-4 | 100% TPG | 30 | 8.0 | — | 12.5 | — |
| C-1 | 100% DEGMPE | 30 | 4.8 | — | 9 | — |
| 13 | 80% DEGMPE + 20% MEA | 30 | 4.0 | 59 | 6.5 | 51 |
| 14 | 60% DEGMPE + 40% MEA | 30 | 3.5 | 76 | 6.2 | 64 |
| 15 | 40% DEGMPE + 60% MEA | 30 | 3.2 | 84 | 5.8 | 73 |
| 16 | 20% DEGMPE + 80% MEA | 30 | 4.5 | 82 | 10 | 61 |
| C-5 | 100% MEA | 30 | >30* | — | >30* | — |
| C-1.1 | 100% DEGMPE | 30 | 4.8 | — | 9.0 | — |
| 1 | 80% DEGMPE + 20% PG | 30 | nm | nm | 7.0 | 22 |
| 2 | 60% DEGMPE + 40% PG | 30 | 5.2 | 65 | 7.5 | 57 |
| 3.1 | 40% DEGMPE + 60% PG | 30 | 4.0 | 80 | 6.2 | 71 |
| 4.1 | 20% DEGMPE + 80% PG | 30 | 19 | 24 | nm | nm |
| C-2.1 | 100% PG | 30 | >30* | — | >30* | — |
| C-1.2 | 100% DEGMPE | 50 | 4.0 | — | 6.0 | — |
| 3.2 | 40% DEGMPE + 60% PG | 50 | nm | nm | 3.0 | 85 |
| 4.2 | 20% DEGMPE + 80% PG | 50 | 7.0 | 72 | nm | nm |
| C-2.2 | 100% PG | 50 | >30 | — | >30 | — |
| 4.3 | 20% DEGMPE + 80% PG | 70 | 4.0 | nm | 8.8 | nm |
| C-1.1 | 100% DEGMPE | 30 | 4.8 | — | 9.0 | — |
| 5 | 80% DEGMPE + 20% DPG | 30 | 3.0 | 52 | 7.5 | 29 |
| 6.1 | 60% DEGMPE + 40% DPG | 30 | nm | nm | 5.8 | 52 |
| 7.1 | 40% DEGMPE + 60% DPG | 30 | nm | nm | 6.5 | 52 |
| 8.1 | 20% DEGMPE + 80% DPG | 30 | 3.5 | 66 | 6.3 | 58 |
| C-3.1 | 100% DPG | 30 | 11.8 | — | 16.5 | — |
| C-1.2 | 100% DEGMPE | 50 | 4.0 | — | 6.0 | — |
| 6.2 | 60% DEGMPE + 40% DPG | 50 | nm | nm | 5.7 | 65 |
| 7.2 | 40% DEGMPE + 60% DPG | 50 | nm | nm | 4.7 | 62 |
| 8.2 | 20% DEGMPE + 80% DPG | 50 | nm | nm | 5 | 65 |
| C-3.2 | 100% DPG | 50 | 8.0 | — | 10.0 | — |
| C-1 | 100% DEGMPE | 30 | 4.8 | — | 9 | — |
| 9 | 80% DEGMPE + 20% TPG | 30 | 5.5 | −1 | 9.2 | 5 |
| 10 | 60% DEGMPE + 40% TPG | 30 | 5.8 | 5 | 9.5 | 9 |
| 11 | 40% DEGMPE + 60% TPG | 30 | 5.5 | 18 | 9.8 | 12 |
| 12 | 20% DEGMPE + 80% TPG | 30 | 6.2 | 16 | 11.5 | 3 |
| C-4 | 100% TPG | 30 | 8.0 | — | 12.5 | — |
| C-7.1 | 100% TEGMME | 30 | 5.5 | — | 9.4 | — |
| 45 | 80% TEGMME + 20% MEA | 30 | 6.5 | 38 | 15.0 | 4 |
| 46.1 | 60% TEGMME + 40% MEA | 30 | >18 | nm | 14.2 | 20 |
| 47.1 | 40% TEGMME + 60% MEA | 30 | >10 | nm | 16 | 26 |
| 48.1 | 20% TEGMME + 80% MEA | 30 | >10 | nm | 21 | 19 |
| C-5.1 | 100% MEA | 30 | >30* | — | >30* | — |
| C-7.2 | 100% TEGMME | 50 | 4.2 | — | 6.2 | — |
| 46.2 | 60% TEGMME + 40% MEA | 50 | 4.0 | 72 | 5.2 | 67 |
| 47.2 | 40% TEGMME + 60% MEA | 50 | 3.0 | 85 | 6.0 | 71 |
| 48.2 | 20% TEGMME + 80% MEA | 50 | 4.2 | 83 | 9.0 | 64 |
| C-5.2 | 100% MEA | 50 | >30 | — | >30 | — |
| C-7.1 | 100% TEGMME | 30 | 5.5 | — | 9.4 | — |
| 41.1 | 80% TEGMME + 20% PG | 30 | 10.0 | −96 | 14.8 | −74 |
| 42.1 | 60% TEGMME + 40% PG | 30 | 10.0 | 35 | 21 | −19 |
| 43.1 | 40% TEGMME + 60% PG | 30 | 15 | 26 | 21.2 | 3 |
| 44.1 | 20% TEGMME + 80% PG | 30 | >15 | nm | 40 | −55 |
| C-2.1 | 100% PG | 30 | >30* | — | >30* | — |
| C-7.2 | 100% TEGMME | 50 | 4.2 | — | 6.2 | — |
| 41.2 | 80% TEGMME + 20% PG | 50 | 4.0 | 57 | 5.2 | 53 |
| 42.2 | 60% TEGMME + 40% PG | 50 | 3.5 | 76 | 5.0 | 68 |
| 43.2 | 40% TEGMME + 60% PG | 50 | 3.2 | 84 | 5.8 | 72 |
| 44.2 | 20% TEGMME + 80% PG | 50 | 7.0 | 72 | 7.2 | 71 |
| C-2.2 | 100% PG | 50 | >30 | — | >30 | — |
| C-7.1 | 100% TEGMME | 30 | 5.5 | — | 9.4 | — |
| 37 | 80% TEGMME + 20% DPG | 30 | 5.2 | 23 | 11 | −2 |
| 38 | 60% TEGMME + 40% DPG | 30 | 8.8 | −10 | 12.8 | −5 |
| 39.1 | 40% TEGMME + 60% DPG | 30 | >15 | <−62 | nm | nm |
| 40.1 | 20% TEGMME + 80% DPG | 30 | 13.1 | −24 | 16.8 | −11 |

TABLE 1-continued

| Test No. | Organic Additive Composition | % AC in WC | Panel Type A ST | % S | Panel Type B ST | % S |
|---|---|---|---|---|---|---|
| C-3.1 | 100% DPG | 30 | 11.8 | — | 16.5 | — |
| C-7.2 | 100% TEGMME | 50 | 4.2 | — | 6.2 | — |
| 39.2 | 40% TEGMME + 60% DPG | 50 | 3.8 | 41 | 5.4 | 36 |
| 40.2 | 20% TEGMME + 80% DPG | 50 | 4.2 | 42 | 6 | 35 |
| C-3.2 | 100% DPG | 50 | 8 | — | 10 | — |
| C-5 | 100% TEGMME | 30 | 5.5 | — | 9.4 | — |
| 33 | 80% TEGMME + 20% TPG | 30 | 7.0 | −17 | 12 | −20 |
| 34 | 60% TEGMME + 40% TPG | 30 | 10 | −54 | 14 | −32 |
| 35 | 40% TEGMME + 60% TPG | 30 | 6.8 | 3 | 12.6 | −12 |
| 36 | 20% TEGMME + 80% TPG | 30 | 5.0 | 33 | 12 | −1 |
| C-4 | 100% TPG | 30 | 8.0 | — | 12.5 | — |
| C-15.1 | 100% DPGMME | 30 | 30 | — | 45.7 | — |
| 159.1 | 80% DPGMME + 20% PG | 30 | 8.8 | 66 | 60 | −49 |
| 160.1 | 60% DPGMME + 40% PG | 30 | 9.3 | 69 | 60 | −52 |
| 161.1 | 40% DPGMME + 60% PG | 30 | 35 | −17 | 60 | −65 |
| 162.1 | 20% DPGMME + 80% PG | 30 | >60 | −100 | >60 | −81 |
| C-2.1 | 100% PG | 30 | >30* | — | >30* | — |
| C-15.2 | 100% DPGMME | 50 | 13.3 | — | 20.7 | — |
| 159.2 | 80% DPGMME + 20% PG | 50 | 7.8 | 53 | 11 | 51 |
| 160.2 | 60% DPGMME + 40% PG | 50 | 7.8 | 61 | 18.5 | 24 |
| 161.2 | 40% DPGMME + 60% PG | 50 | 6.0 | 74 | 12.7 | 52 |
| 162.2 | 20% DPGMME + 80% PG | 50 | 6.2 | 77 | 20 | 29 |
| C-2.2 | 100% PG | 50 | >30 | — | >30 | — |
| C-15.1 | 100% DPGMME | 30 | 30 | — | 45.7 | — |
| 163.1 | 80% DPGMME + 20% DPG | 30 | 10 | 60 | 13.1 | 65 |
| 164.1 | 60% DPGMME + 40% DPG | 30 | 6.0 | 74 | 8.5 | 75 |
| 165.1 | 40% DPGMME + 60% DPG | 30 | 6.2 | 68 | 9.0 | 68 |
| 166.1 | 20% DPGMME + 80% DPG | 30 | 5.8 | 62 | 11.5 | 49 |
| C-3.1 | 100% DPG | 30 | 11.8 | — | 16.5 | — |
| C-15.2 | 100% DPGMME | 50 | 13.3 | — | 20.7 | — |
| 163.2 | 80% DPGMME + 20% DPG | 50 | 6.9 | 44 | 8.8 | 53 |
| 164.2 | 60% DPGMME + 40% DPG | 50 | 5.0 | 55 | 5.8 | 65 |
| 165.2 | 40% DPGMME + 60% DPG | 50 | 4.2 | 58 | 5.5 | 61 |
| 166.2 | 20% DPGMME + 80% DPG | 50 | 3.7 | 59 | 5.7 | 53 |
| C-3.2 | 100% DPG | 50 | 8.0 | — | 10.0 | — |
| C-15.1 | 100% DPGMME | 30 | 30 | — | 45.7 | — |
| 167.1 | 80% DPGMME + 20% TPG | 30 | 10.7 | 58 | 16.5 | 57 |
| 168.1 | 60% DPGMME + 40% TPG | 30 | 9.2 | 57 | 14 | 57 |
| 169.1 | 40% DPGMME + 60% TPG | 30 | 6.5 | 61 | 9.0 | 65 |
| 170.1 | 20% DPGMME + 80% TPG | 30 | 6.2 | 50 | 8.5 | 56 |
| C-4.1 | 100% TPG | 30 | 8.0 | — | 12.5 | — |
| C-15.2 | 100% DPGMME | 50 | 13.3 | — | 20.7 | — |
| 167.2 | 80% DPGMME + 20% TPG | 50 | 7.5 | 38 | 10.6 | 43 |
| 168.2 | 60% DPGMME + 40% TPG | 50 | 6.2 | 42 | 9.0 | 46 |
| 169.2 | 40% DPGMME + 60% TPG | 50 | 9.0 | 5 | 14 | 6 |
| 170.2 | 20% DPGMME + 80% TPG | 50 | 8.8 | −7 | 12.1 | 6 |
| C-4.2 | 100% TPG | 50 | 7.0 | — | 11.0 | — |
| C-6 | 100% DEGMnBE | 30 | 6.5 | — | 11.6 | — |
| 17 | 80% DEGMnBE + 20% MEA | 30 | 5.5 | 51 | 11.5 | 25 |
| 18 | 60% DEGMnBE + 40% MEA | 30 | 5.8 | 64 | 12 | 37 |
| 19 | 40% DEGMnBE + 60% MEA | 30 | 4.8 | 77 | 9.8 | 57 |
| 20 | 20% DEGMnBE + 80% MEA | 30 | 6 | 76 | 12.2 | 54 |
| C-5 | 100% MEA | 30 | >30* | — | >30* | — |
| C-6 | 100% DEGMnBE | 30 | 6.5 | — | 11.6 | — |
| 21 | 80% DEGMnBE + 20% PG | 30 | 6.0 | 46 | 10.5 | 31 |
| 22 | 60% DEGMnBE + 40% PG | 30 | 5.0 | 69 | 9.8 | 48 |
| 23 | 40% DEGMnBE + 60% PG | 30 | 5.0 | 76 | 10.0 | 56 |
| 24 | 20% DEGMnBE + 80% PG | 30 | 7.8 | 69 | 10.0 | 62 |
| C-2 | 100% PG | 30 | >30* | — | >30* | — |
| C-6 | 100% DEGMnBE | 30 | 6.5 | — | 11.6 | — |
| 25 | 80% DEGMnBE + 20% DPG | 30 | 7.2 | 5 | 13.5 | −7 |
| 26 | 60% DEGMnBE + 40% DPG | 30 | 8.8 | −2 | 11.0 | 19 |
| 27 | 40% DEGMnBE + 60% DPG | 30 | 5.5 | 43 | 10.2 | 30 |
| 28 | 20% DEGMnBE + 80% DPG | 30 | 5.5 | 49 | 7.5 | 52 |
| C-3 | 100% DPG | 30 | 11.8 | — | 16.5 | — |
| C-6 | 100% DEGMnBE | 30 | 6.5 | — | 11.6 | — |
| 29 | 80% DEGMnBE + 20% TPG | 30 | 8.0 | −18 | 14.5 | −23 |
| 30 | 60% DEGMnBE + 40% TPG | 30 | 11.0 | −55 | 15.8 | −32 |
| 31 | 40% DEGMnBE + 60% TPG | 30 | 6.2 | 16 | 12.5 | −3 |
| 32 | 20% DEGMnBE + 80% TPG | 30 | 9.0 | −17 | 11.8 | 4 |
| C-4 | 100% TPG | 30 | 8.0 | — | 12.5 | — |
| C-7.1 | 100% TEGMEE | 30 | 5.5 | — | 9.4 | — |
| 61 | 80% TEGMEE + 20% MEA | 30 | 4.0 | 62 | 7.8 | 42 |
| 62 | 60% TEGMEE + 40% MEA | 30 | 4.0 | 74 | 7.5 | 57 |
| 63.1 | 40% TEGMEE + 60% MEA | 30 | 6.5 | 68 | 14.9 | 32 |

TABLE 1-continued

| Test No. | Organic Additive Composition | % AC in WC | Panel Type A ST | % S | Panel Type B ST | % S |
|---|---|---|---|---|---|---|
| 64.1 | 20% TEGMEE + 80% MEA | 30 | 6.5 | 74 | 18 | 30 |
| C-5.1 | 100% MEA | 30 | >30* | — | >30* | — |
| C-7.2 | 100% TEGMEE | 50 | 4.2 | — | 6.2 | — |
| 63.2 | 40% TEGMEE + 60% MEA | 50 | 3.5 | 82 | 6.7 | 67 |
| 64.2 | 20% TEGMEE + 80% MEA | 50 | 4.2 | 83 | 6 | 76 |
| C-5.2 | 100% MEA | 50 | >30 | — | >30 | — |
| C-7.1 | 100% TEGMEE | 30 | 5.1 | — | 9.1 | — |
| 49 | 80% TEGMEE + 20% PG | 30 | 4.0 | 60 | 9.0 | 32 |
| 50 | 60% TEGMEE + 40% PG | 30 | 5.0 | 67 | 9.3 | 47 |
| 51.1 | 40% TEGMEE + 60% PG | 30 | >10 | nm | 15 | 31 |
| 52.1 | 20% TEGMEE + 80% PG | 30 | 10.0 | 60 | 20 | 23 |
| C-2.1 | 100% PG | 30 | >30* | — | >30* | — |
| C-7.2 | 100% TEGMEE | 50 | 3.9 | — | 6.0 | — |
| 51.2 | 40% TEGMEE + 60% PG | 50 | 2.8 | 86 | 6.0 | 71 |
| 52.2 | 20% TEGMEE + 80% PG | 50 | 3.0 | 88 | 6.4 | 75 |
| C-2.2 | 100% PG | 50 | >30 | — | >30 | — |
| C-7.1 | 100% TEGMEE | 30 | 5.1 | — | 9.1 | — |
| 53 | 80% TEGMEE + 20% DPG | 30 | 3.8 | 41 | 10.5 | 1 |
| 54 | 60% TEGMEE + 40% DPG | 30 | 3.8 | 51 | 7.8 | 35 |
| 55.1 | 40% TEGMEE + 60% DPG | 30 | 9.0 | 1 | 7.3 | 46 |
| 56.1 | 20% TEGMEE + 80% DPG | 30 | 9.2 | 12 | 15.5 | −3 |
| C-3.1 | 100% DPG | 30 | 11.8 | — | 16.5 | — |
| C-7.2 | 100% TEGMEE | 50 | 3.9 | — | 6.0 | — |
| 55.2 | 40% TEGMEE + 60% DPG | 50 | 6.0 | 6 | 5.2 | 38 |
| 56.2 | 20% TEGMEE + 80% DPG | 50 | 4.8 | 33 | 5.7 | 38 |
| C-3.2 | 100% DPG | 50 | 8.0 | — | 10.0 | — |
| C-7 | 100% TEGMEE | 30 | 5.1 | — | 9.1 | — |
| 57 | 80% TEGMEE + 20% TPG | 30 | 4.2 | 26 | 8.5 | 13 |
| 58 | 60% TEGMEE + 40% TPG | 30 | 5.0 | 20 | 8.8 | 16 |
| 59 | 40% TEGMEE + 60% TPG | 30 | 5.5 | 20 | 12.3 | −10 |
| 60 | 20% TEGMEE + 80% TPG | 30 | 5.2 | 30 | 12.2 | −3 |
| C-4 | 100% TPG | 30 | 8.0 | — | 12.5 | — |
| C-13 | 100% DEGMHE | 30 | 9.0 | — | 16.5 | — |
| 141 | 80% DEGMHE + 20% PG | 30 | 6.1 | 54 | 18.1 | 6 |
| 142 | 60% DEGMHE + 40% PG | 30 | 9.2 | 47 | 19.1 | 13 |
| 143 | 40% DEGMHE + 60% PG | 30 | 11.5 | 47 | 18.5 | 25 |
| 144 | 20% DEGMHE + 80% PG | 30 | 9.0 | 65 | 13 | 52 |
| C-2 | 100% PG | 30 | >30* | — | >30* | — |
| C-13 | 100% DEGMHE | 30 | 9.0 | — | 16.5 | — |
| 137 | 80% DEGMHE + 20% DPG | 30 | 8.8 | 8 | 16.6 | −1 |
| 138 | 60% DEGMHE + 40% DPG | 30 | 5.2 | 49 | 10.8 | 35 |
| 139 | 40% DEGMHE + 60% DPG | 30 | 6.0 | 44 | 11.7 | 29 |
| 140 | 20% DEGMHE + 80% DPG | 30 | 6.2 | 45 | 12.6 | 24 |
| C-3 | 100% DPG | 30 | 11.8 | — | 16.5 | — |
| C-13 | 100% DEGMHE | 30 | 9.0 | — | 16.5 | — |
| 133 | 80% DEGMHE + 20% TPG | 30 | 8.3 | 6 | 19 | −21 |
| 134 | 60% DEGMHE + 40% TPG | 30 | 8.5 | 1 | 13.7 | 8 |
| 135 | 40% DEGMHE + 60% TPG | 30 | 8.8 | −5 | 14 | 1 |
| 136 | 20% DEGMHE + 80% TPG | 30 | 9.2 | −12 | 14.6 | −10 |
| C-4 | 100% TPG | 30 | 8.0 | — | 12.5 | — |
| C-8 | 100% TEGMnBE | 30 | 7.0 | — | 12.2 | — |
| 65 | 80% TEGMnBE + 20% MEA | 30 | 7.0 | 40 | 14.3 | 9 |
| 66 | 60% TEGMnBE + 40% MEA | 30 | 7.0 | 57 | 14.3 | 26 |
| 67 | 40% TEGMnBE + 60% MEA | 30 | 4.7 | 77 | 9.2 | 60 |
| 68 | 20% TEGMnBE + 80% MEA | 30 | 6.0 | 76 | 10.0 | 62 |
| C-5 | 100% MEA | 30 | >30* | — | >30* | — |
| C-8 | 100% TEGMnBE | 30 | 7.0 | — | 12.2 | — |
| 69 | 80% TEGMnBE + 20% PG | 30 | 7.0 | 40 | 13 | 18 |
| 70 | 60% TEGMnBE + 40% PG | 30 | 7.0 | 57 | 12.8 | 34 |
| 71 | 40% TEGMnBE + 60% PG | 30 | 6.2 | 70 | 12.2 | 47 |
| 72 | 20% TEGMnBE + 80% PG | 30 | 6.2 | 76 | 12.2 | 54 |
| C-2 | 100% PG | 30 | >30* | — | >30* | — |
| C-8 | 100% TEGMnBE | 30 | 7.0 | — | 12.2 | — |
| 73 | 80% TEGMnBE + 20% DPG | 30 | 5.0 | 37 | 13.2 | −1 |
| 74 | 60% TEGMnBE + 40% DPG | 30 | 5.2 | 42 | 9.9 | 29 |
| 75 | 40% TEGMnBE + 60% DPG | 30 | 5.0 | 49 | 9.8 | 34 |
| 76 | 20% TEGMnBE + 80% DPG | 30 | 5.5 | 49 | 10.5 | 33 |
| C-3 | 100% DPG | 30 | 11.8 | — | 16.5 | — |
| C-8 | 100% TEGMnBE | 30 | 7.0 | — | 12.2 | — |
| 77 | 80% TEGMnBE + 20% TPG | 30 | 9.8 | −36 | 11.3 | 8 |
| 78 | 60% TEGMnBE + 40% TPG | 30 | 9.8 | −32 | 11.5 | 7 |
| 79 | 40% TEGMnBE + 60% TPG | 30 | 10.0 | −32 | 12 | 3 |
| 80 | 20% TEGMnBE + 80% TPG | 30 | 10.0 | −28 | 12 | 4 |
| C-4 | 100% TPG | 30 | 8.0 | — | 12.5 | — |
| C-9 | 100% DPGMnBE | 30 | 43 | — | 52 | — |

TABLE 1-continued

| Test No. | Organic Additive Composition | % AC in WC | Panel Type A ST | % S | Panel Type B ST | % S |
|---|---|---|---|---|---|---|
| 93 | 80% DPGMnBE + 20% MEA | 30 | 30 | 26 | 34 | 29 |
| 94 | 60% DPGMnBE + 40% MEA | 30 | 20 | 47 | 26 | 40 |
| 95 | 40% DPGMnBE + 60% MEA | 30 | 18 | 49 | 24 | 38 |
| 96 | 20% DPGMnBE + 80% MEA | 30 | 10.8 | 67 | 20 | 42 |
| C-5 | 100% MEA | 30 | >30* | — | >30* | — |
| C-9.1 | 100% DPGMnBE | 30 | 43 | — | 52 | — |
| 81.1 | 80% DPGMnBE + 20% PG | 30 | >10 | nm | 70 | −31 |
| 82.1 | 60% DPGMnBE + 40% PG | 30 | >10 | nm | 71 | −64 |
| 83.1 | 40% DPGMnBE + 60% PG | 30 | >10 | nm | 65 | −68 |
| 84.1 | 20% DPGMnBE + 80% PG | 30 | >10 | nm | 125 | −263 |
| C-2.1 | 100% PG | 30 | >30* | — | >30* | — |
| C-9.2 | 100% DPGMnBE | 50 | 37 | — | 36 | — |
| 81.2 | 80% DPGMnBE + 20% PG | 50 | >10 | nm | 60 | −72 |
| 82.2 | 60% DPGMnBE + 40% PG | 50 | >10 | nm | 60 | −79 |
| 83.2 | 40% DPGMnBE + 60% PG | 50 | >10 | nm | 45 | −39 |
| 84.2 | 20% DPGMnBE + 80% PG | 50 | >10 | nm | 70 | −124 |
| C-2.2 | 100% PG | 50 | >30 | — | >30 | — |
| C-9 | 100% DPGMnBE | 30 | 43 | — | 52 | — |
| 85 | 80% DPGMnBE + 20% DPG | 30 | 17 | 54 | 45 | 0 |
| 86 | 60% DPGMnBE + 40% DPG | 30 | 45 | −47 | 57 | −51 |
| 87 | 40% DPGMnBE + 60% DPG | 30 | 20 | 18 | 25 | 19 |
| 88 | 20% DPGMnBE + 80% DPG | 30 | 12 | 33 | 16 | 32 |
| C-3 | 100% DPG | 30 | 11.8 | — | 16.5 | — |
| C-9 | 100% DPGMnBE | 30 | 43 | — | 52 | — |
| 89 | 80% DPGMnBE + 20% TPG | 30 | 30 | 17 | 45 | −2 |
| 90 | 60% SPGMnBE + 40% TPG | 30 | 16.5 | 43 | 22 | 39 |
| 91 | 40% DPGMnBE + 60% TPG | 30 | 9.8 | 55 | 20 | 29 |
| 92 | 20% DPGMnBE + 80% TPG | 30 | 8.0 | 47 | 15.2 | 25 |
| C-4 | 100% TPG | 30 | 8.0 | — | 12.5 | — |
| C-11 | 100% DPGMtBE | 30 | 46 | — | 55 | — |
| 125 | 80% DPGMtBE + 20% MEA | 30 | 31 | 28 | 34 | 32 |
| 126 | 60% DPGMtBE + 40% MEA | 30 | 28 | 29 | 30 | 33 |
| 127 | 40% DPGMtBE + 60% MEA | 30 | 15 | 59 | 17 | 58 |
| 128 | 20% DPGMtBE + 80% MEA | 30 | 23 | 31 | 34 | 3 |
| C-5 | 100% MEA | 30 | >30* | — | >30* | — |
| C-11 | 100% DPGMtBE | 30 | 46 | — | 55 | — |
| 121 | 80% DPGMtBE + 20% PG | 30 | 38 | 11 | 66 | −32 |
| 122 | 60% DPGMtBE + 40% PG | 30 | 24 | 39 | 55 | −22 |
| 123 | 40% DPGMtBE + 60% PG | 30 | 39 | −7 | 45 | −13 |
| 124 | 20% DPGMtBE + 80% PG | 30 | 49 | −48 | 99 | −183 |
| C-2 | 100% PG | 30 | >30* | — | >30* | — |
| C-11 | 100% DPGMtBE | 30 | 46 | — | 55 | — |
| 117 | 80% DPGMtBE + 20% DPG | 30 | 38 | 3 | 49 | −4 |
| 118 | 60% DPGMtBE + 40% DPG | 30 | 20 | 38 | 32 | 19 |
| 119 | 40% DPGMtBE + 60% DPG | 30 | 15 | 41 | 26 | 18 |
| 120 | 20% DPGMtBE + 80% DPG | 30 | 13 | 30 | 19 | 21 |
| C-3 | 100% DPG | 30 | 11.8 | — | 16.5 | — |
| C-11 | 100% DPGMtBE | 30 | 46 | — | 55 | — |
| 113 | 80% DPGMtBE + 20% TPG | 30 | 47 | −22 | 54 | −16 |
| 114 | 60% DPGMtBE + 40% TPG | 30 | 24 | 22 | 33 | 13 |
| 115 | 40% DPGMtBE + 60% TPG | 30 | 16 | 31 | 28 | 5 |
| 116 | 20% DPGMtBE + 80% TPG | 30 | 10.4 | 33 | 22 | −5 |
| C-4 | 100% TPG | 30 | 8.0 | — | 12.5 | — |
| C-14.1 | 100% TPGMME | 30 | 32.5 | — | 45** | — |
| 147.1 | 80% TPGMME + 20% PG | 30 | 26 | 12 | 38.7 | 8 |
| 148.1 | 60% TPGMME + 40% PG | 30 | 18.4 | 42 | 29.6 | 24 |
| 149.1 | 40% TPGMME + 60% PG | 30 | 18.3 | 41 | 27.1 | 25 |
| 150.1 | 20% TPGMME + 80% PG | 30 | 17.3 | 43 | 24.2 | 27 |
| C-2.1 | 100% PG | 30 | >30* | — | >30* | — |
| C-14.2 | 100% TPGMME | 50 | 9.0 | — | 19.3 | — |
| 147.2 | 80% TPGMME + 20% PG | 50 | 25 | −89 | 39.3 | −83 |
| 148.2 | 60% TPGMME + 40% PG | 50 | 17.5 | −1 | 30.7 | −30 |
| 149.2 | 40% TPGMME + 60% PG | 50 | 17 | 21 | 26.5 | −3 |
| 150.2 | 20% TPGMME + 80% PG | 50 | 15.5 | 40 | 22.1 | 21 |
| C-2.2 | 100% PG | 50 | >30 | — | >30 | — |
| C-14.1 | 100% TPGMME | 30 | 32.5 | — | 45** | — |
| 151.1 | 80% TPGMME + 20% DPG | 30 | 11.7 | 57 | 21.5 | 44 |
| 152.1 | 60% TPGMME + 40% DPG | 30 | 9.2 | 62 | 17 | 49 |
| 153.1 | 40% TPGMME + 60% DPG | 30 | 8.7 | 57 | 12.1 | 57 |
| 154.1 | 20% TPGMME + 80% DPG | 30 | 7.5 | 53 | 9.2 | 59 |
| C-3.1 | 100% DPG | 30 | 11.8 | — | 16.5 | — |
| C-14.2 | 100% TPGMME | 50 | 9.0 | — | 19.3 | — |
| 151.2 | 80% TPGMME + 20% DPG | 50 | 10.1 | −15 | 16.6 | 5 |
| 152.2 | 60% TPGMME + 40% DPG | 50 | 6.5 | 24 | 12.5 | 20 |
| 153.2 | 40% TPGMME + 60% DPG | 50 | 6.0 | 29 | 8.1 | 41 |

TABLE 1-continued

| Test No. | Organic Additive Composition | % AC in WC | Panel Type A ST | % S | Panel Type B ST | % S |
|---|---|---|---|---|---|---|
| 154.2 | 20% TPGMME + 80% DPG | 50 | 4.5 | 45 | 5.0 | 58 |
| C-3.2 | 100% DPG | 50 | 8 | — | 10 | — |
| C-14.1 | 100% TPGMME | 30 | 32.5 | — | 45** | — |
| 155.1 | 80% TPGMME + 20% TPG | 30 | 20 | 28 | 41 | −5 |
| 156.1 | 60% TPGMME + 40% TPG | 30 | 12.8 | 44 | 22.7 | 29 |
| 157.1 | 40% TPGMME + 60% TPG | 30 | 11.4 | 36 | 18.8 | 26 |
| 158.1 | 20% TPGMME + 80% TPG | 30 | 10.5 | 19 | 12.7 | 33 |
| C-4.1 | 100% TPG | 30 | 8.0 | — | 12.5 | — |
| C-14.2 | 100% TPGMME | 50 | 9.0 | — | 19.3 | — |
| 155.2 | 80% TPGMME + 20% TPG | 50 | 8 | −63 | 19.5 | −11 |
| 156.2 | 60% TPGMME + 40% TPG | 50 | 9.2 | −12 | 15.5 | 3 |
| 157.2 | 40% TPGMME + 60% TPG | 50 | 6.5 | 17 | 11 | 23 |
| 158.2 | 20% TPGMME + 80% TPG | 50 | 6.0 | 19 | 8.0 | 37 |
| C-4.2 | 100% TPG | 50 | 7.0 | — | 11.0 | — |
| C-10 | 100% TPGMnBE | 30 | 70 | — | 150 | — |
| 97 | 80% TPGMnBE + 20% MEA | 30 | 40 | 35 | 70 | 44 |
| 98 | 60% TPGMnBE + 40% MEA | 30 | 27 | 50 | 55 | 46 |
| 99 | 40% TPGMnBE + 60% MEA | 30 | 19.6 | 57 | 41 | 47 |
| 100 | 20% TPGMnBE + 80% MEA | 30 | 14.1 | 63 | 29 | 46 |
| C-5 | 100% MEA | 30 | >30* | — | >30* | — |
| C-10 | 100% TPGMnBE | 30 | 70 | — | 150 | — |
| 101 | 80% TPGMnBE + 20% PG | 30 | 56 | 10 | 65 | 48 |
| 102 | 60% TPGMnBE + 40% PG | 30 | 70 | −30 | 80 | 22 |
| 103 | 40% TPGMnBE + 60% PG | 30 | 51 | −11 | 60 | 23 |
| 104 | 20% TPGMnBE + 80% PG | 30 | 30 | 21 | 37 | 31 |
| C-2 | 100% PG | 30 | >30* | — | >30* | — |
| C-10 | 10% TPGMnBE | 30 | 70 | — | 150 | — |
| 105 | 80% TPGMnBE + 20% DPG | 30 | 40 | 31 | 60 | 51 |
| 106 | 60% TPGMnBE + 40% DPG | 30 | 20 | 57 | 37 | 62 |
| 107 | 40% TPGMnBE + 60% DPG | 30 | 14 | 60 | 29.5 | 58 |
| 108 | 20% TPGMnBE + 80% DPG | 30 | 10.2 | 56 | 14.3 | 67 |
| C-3 | 100% DPG | 30 | 11.8 | — | 16.5 | — |
| C-10 | 100% TPGMnBE | 30 | 70 | — | 150 | — |
| 109 | 80% TPGMnBE + 20% TPG | 30 | 46 | 20 | 50 | 59 |
| 110 | 60% TPGMnBE + 40% TPG | 30 | 31 | 31 | 48 | 49 |
| 111 | 40% TPGMnBE + 60% TPG | 30 | 12 | 63 | 23 | 66 |
| 112 | 20% TPGMnBE + 80% TPG | 30 | 10.0 | 51 | 16 | 60 |
| C-4 | 100% TPG | 30 | 8.0 | — | 12.5 | — |
| C-13 | 100% DEGMHE | 30 | 9.0 | — | 16.5 | — |
| 145 | 50% DEGMHE + 50% EGMFE | 30 | 4.5 | 31 | 9.0 | 20 |
| 146 | 65% DEGMHE + 35% EGMFE | 30 | 5.0 | 31 | 10.0 | 22 |
| C-12 | 100% EGMFE | 30 | 4.0 | — | 6.0 | — |

Footnotes for Table 1
*This lower limit was not directly measured, but was inferred from the value measured with 50% of alkaline concentrate and the inevitable observation that stripping times are longer for strippers with only 30% of alkaline concentrate, with all other active ingredients maintained the same.
**About 5% of the coating remained after this time, but the test was nevertheless discontinued.
Abbreviations for Table 1
"AC" = "Alkaline Concentrate";
"WC" = "Working Composition";
"ST" = "Stripping Time";
"% S" = "Percent Synergy" or if the value is negative, "Percent Antisynergy";
"Min" = "Minutes";
"nm" = "not measured", or, in columns where the values are calculated rather than directly measured, "not meaningful" (because at least one directly measured value required for the calculation was not measured at all or was merely given a lower limit rather than a complete measurement).

The invention claimed is:

1. A composition of matter useful as an additive to alkaline stripping compositions to increase the speed of stripping thereof, said composition consisting of a combination of solvents selected from the group of combinations consisting of:

EGMFE and TPG, with a fraction by weight of TPG that is from about 0.40 to about 0.95;

DEGMPE and MEA, with a fraction by weight of MEA that is from about 0.10 to about 0.90;

DEGMPE and PG, with a fraction by weight of PG that is from about 0.50 to about 0.75;

DEGMPE and DPG, with a fraction by weight of DPG that is from about 0.10 to about 0.90;

TEGMME and MEA, with a fraction by weight of MEA that is from about 0.40 to about 0.80;

TEGMME and PG, with a fraction by weight of PG that is from about 0.15 to about 0.80;

TEGMME and DPG, with a fraction by weight of DPG that is from about 0.35 to about 0.95:

DPGMME and PG, with a fraction by weight of PG that is from about 0.05 to about 0.90;

DPGMME and DPG, with a fraction by weight of DPG that is from about 0.10 to about 0.90;

DPGMME and TPG, with a fraction by weight of TPG that is from about 0.25 to about 0.90;

DEGMnBE and MEA, with a fraction by weight of MEA that is from about 0.15 to about 0.90;

DEGMnBE and PG, with a fraction by weight of PG that is from about 0.20 to about 0.90;

DEGMnBE and DPG, with a fraction by weight of DPG that is from about 0.50 to about 0.95;

TEGMEE and MEA, with a fraction by weight of MEA that is from about 0.12 to about 0.80;

TEGMEE and PG, with a fraction by weight of PG that is either from about 0.10 to about 0.45 or from about 0.50 to about 0.90;

TEGMEE and DPG, with a fraction by weight of DPG that is from about 0.10 to about 0.95;

TEGMEE and TPG, with a fraction by weight of TPG that is from about 0.10 to about 0.90;

DEGMHE and PG, with a fraction by weight of PG that is about 0.20;

DEGMHE and DPG, with a fraction by weight of DPG that is from about 0.20 to about 0.81;

TEGMnBE and MEA, with a fraction by weight of MEA that is from about 0.45 to about 0.90;

TEGMnBE and PG, with a fraction by weight of PG that is from about 0.45 to about 0.90;

TEGMnBE and DPG, with a fraction by weight of DPG that is from about 0.10 to about 0.81;

TPGMME and DPG, with a fraction by weight of DPG that is from about 0.20 to about 0.95;

TPGMME and TPG, with a fraction by weight of TPG that is from about 0.50 to about 0.95;

TPGMnBE and MEA, with a fraction by weight of MEA that is from about 0.20 to about 0.80; and TPGMnBE and PG, with a fraction by weight of PG that is about 0.20 or about 0.60.

2. A composition according to claim 1, selected from the group of combinations consisting of:

EGMFE and TPG, with a fraction by weight of TPG that is from about 0.60 to about 0.90;

DEGMPE and MEA, with a fraction by weight of MEA that is from about 0.30 to about 0.80;

DEGMPE and PG, with a fraction by weight of PG that is from about 0.55 to about 0.65;

DEGMPE and DPG, with a fraction by weight of DPG that preferably is from about 0.19 to about 0.85;

TEGMME and MEA, with a fraction by weight of MEA that is from about 0.45 to about 0.70;

TEGMME and PG, with a fraction by weight of PG that is from about 0.20 to about 0.70;

TEGMME and DPG, with a fraction by weight of DPG that is from 0.55 to 0.90;

DPGMME and PG, with a fraction by weight of PG that is from about 0.10 to about 0.81;

DPGMME and DPG, with a fraction by weight of DPG that is from about 0.20 to about 0.85;

DPGMME and TPG, with a fraction by weight of TPG that is from about 0.35 to about 0.85;

DEGMnBE and MEA, with a fraction by weight of MEA that is from about 0.20 to about 0.85;

DEGMnBE and PG, with a fraction by weight of PG that is from about 0.30 to about 0.80;

DEGMnBE and DPG, with a fraction by weight of DPG that is from about 0.55 to about 0.90;

TEGMEE and MEA, with a fraction by weight of MEA that is from about 0.18 to about 0.60;

TEGMEE and PG, with a fraction by weight of PG that is either from about 0.15 to about 0.40 or from about 0.55 to about 0.85;

TEGMEE and DPG, with a fraction by weight of DPG that is from about 0.15 to about 0.80;

TEGMEE and TPG, with a fraction by weight of TPG that is from about 0.15 to about 0.55;

DEGMHE and DPG, with a fraction by weight of DPG that is from about 0.30 to about 0.61;

TEGMnBE and MEA, with a fraction by weight of MEA that is from about 0.50 to about 0.81;

TEGMnBE and PG, with a fraction by weight of PG that is from about 0.50 to about 0.85;

TEGMnBE and DPG, with a fraction by weight of DPG that is from about 0.20 to about 0.70;

TPGMME and DPG, with a fraction by weight of DPG that is from about 0.60 to about 0.90; and TPGMME and TPG, with a fraction by weight of TPG that is from about 0.60 to about 0.90.

3. A composition according to claim 2, wherein the combination is selected from the group of combinations consisting of:

EGMFE and TPG, with a fraction by weight of TPG that is from about 0.80 to about 0.85;

DEGMPE and MEA, with a fraction by weight of MEA that is from about 0.50 to about 0.65;

DEGMPE and PG, with a fraction by weight of PG that is from about 0.59 to about 0.61;

DEGMPE and DPG, with a fraction by weight of DPG that is from about 0.39 to about 0.81;

TEGMME and MEA, with a fraction by weight of MEA that is from about 0.55 to about 0.65;

TEGMME and PG, with a fraction by weight of PG that is from about 0.39 to about 0.60;

TEGMME and DPG, with a fraction by weight of DPG that is from about 0.60 to about 0.81;

DPGMME and PG, with a fraction by weight of PG that is from about 0.20 to about 0.81;

DPGMME and DPG, with a fraction by weight of DPG that is from about 0.60 to about 0.81;

DPGMME and TPG, with a fraction by weight of TPG that is from about 0.40 to about 0.81;

DEGMnBE and MEA, with a fraction by weight of MEA that is from about 0.58 to about 0.70;

DEGMnBE and PG, with a fraction by weight of PG that is from about 0.40 to about 0.70;

DEGMnBE and DPG, with a fraction by weight of DPG that is from about 0.60 to about 0.81;

TEGMEE and MEA, with a fraction by weight of MEA that is from about 0.38 to about 0.45;

TEGMEE and PG, with a fraction by weight of PG that is either from about 0.20 to about 0.30 or from about 0.55 to about 0.70;

TEGMEE and DPG, with a fraction by weight of DPG that is from about 0.20 to about 0.61;

TEGMEE and TPG, with a fraction by weight of TPG that is from about 0.18 to about 0.21;

DEGMHE and DPG, with a fraction by weight of DPG that is from about 0.39 to about 0.46;

TEGMnBE and MEA, with a fraction by weight of MEA that is from about 0.55 to about 0.66;

TEGMnBE and PG, with a fraction by weight of PG that is from about 0.59 to about 0.81;

TEGMnBE and DPG, with a fraction By weight of DPG that is from about 0.40 to about 0.61;

TPGMME and DPG, with a fraction by weight of DPG that is from about 0.70 to about 0.85; and TPGMME and TPG, with a fraction by weight of TPG that is from about 0.70 to about 0.85.

4. A composition according to claim 3, wherein the combination is selected from the group consisting of:

DPGMME and PG, with a fraction by weight of PG that is from about 0.20 to about 0.25;

DPGMME and DPG, with a fraction by weight of DPG that is from about 0.70 to about 0.81;

DPGMME and TPG, with a fraction by weight of TPG that is from about 0.60 to about 0.81;

TPGMME and DPG, with a fraction by weight of DPG that is from about 0.80 to about 0.85: and TPGMME and TPG, with a fraction by weight of TPG that is from about 0.80 to about 0.85.

5. A liquid paint stripping composition consisting essentially of water and:

(A) at least one dissolved alkali or alkaline earth metal hydroxide; and (B) a composition of matter according to claim 4.

6. A liquid paint stripping composition according to claim 5, consisting essentially of water and:

(A) at least one dissolved alkali or alkaline earth metal hydroxide;

(B) a composition of matter according to claim 4; and (C) a component selected from the group consisting of gluconic acid, water soluble and water dispersible salts of gluconic acid, heptogluconic acid and its water soluble and water dispersible salts, and glucono-delta-lactone.

7. A liquid paint stripping composition according to claim 6, consisting essentially of water and:

(A) from about 0.1 to about 10 M/kg of total liquid paint stripping composition of dissolved alkali metal hydroxicle selected from the group consisting of sodium, potassium, rubidium, and cesium hydroxides and mixtures thereof;

(B) from about 3 to about 30 percent of total liquid paint stripping composition of component (B); and (C) from about 0.03 to about 2.0 M/kg of total liquid paint stripping composition of a component selected from the group consisting of gluconic acid, water soluble and water dispersible salts of gluconic acid, heptogluconic acid and its water soluble and water dispersible salts, and glucono-delta-lactone; and, optionally, one or more of the following components:

(D) surfactant; and (E) alkaline salts exclusive of alkali metal and alkaline earth metal hydroxides.

8. A liquid paint stripping composition according to claim 7, consisting essentially of water and:

(A) from about 0.5 to about 5 M/kg of total liquid paint stripping composition of dissolved alkali metal hydroxide selected from the group consisting of sodium, potassium rubidium, and cesium hydroxides and mixtures thereof;

(B) from about 5 to about 25 percent of total liquid paint stripping composition of component (B); and (C) from about 0.07 to about 0.8 M/kg of total liquid paint stripping composition of a component selected from the group consisting of gluconic acid, water soluble and water dispersible salts of gluconic acid, heptogluconic acid and its water soluble and water dispersible salts, and glucono-delta-lactone; and, optionally, one or more of the following components:

(D) surfactant; and (E) alkaline salts exclusive of alkali metal and alkaline earth metal hydroxides.

9. A liquid paint stripping composition according to claim 8, consisting essentially of water and:

(A) from about 1.1 to about 4.5 M/kg of the total liquid paint stripping composition of dissolved alkali metal hydroxide selected from the group consisting of sodium and potassium hydroxides and mixtures thereof;

(B) from about 9 to about 18 percent of the total liquid paint stripping composition of component (B); and (C) from about 0.15 to about 0.45 M/kg of total liquid paint stripping composition of a component selected from the group consisting of gluconic acid and water soluble and water dispersible salts of gluconic acid; and, optionally, one or more of the following components:

(D) surfactant; and (E) alkaline salts exclusive of alkali metal and alkaline earth metal hydroxides.

10. A liquid paint stripping composition according to claim 9, consisting essentially of water and:

(A) from about 2.6 to about 3.5 M/kg of the total composition of potassium hydroxide;

(B) from about 11 to about 17 percent of the total composition of component (B); and (C) from about 0.17 to about 0.24 M/kg of total composition of a component selected from the group consisting of gluconic acid and water soluble and water dispersible salts of gluconic acid; and, optionally, one or more of me following components:

(D) surfactant; and (E) alkaline salts exclusive of alkali metal and alkaline earth metal hydroxides.

11. A liquid paint stripping composition according to claim 10, consisting essentially of water and:

(A) from about 2.8 to about 3.2 M/kg of the total liquid paint stripping composition of component (A);

(B) from about 13 to about 17 percent of the total liquid paint stripping composition of component (B); and (C) from about 0.18 to about 0.23 M/kg of total liquid paint stripping composition of a component selected from the group consisting of gluconic acid and water soluble and water dispersible salts of gluconic acid; and, optionally, one or more of the following components:

(E) surfactant; and (F) alkaline salts exclusive of alkali metal and alkaline earth metal hydroxides.

12. A liquid paint stripping composition consisting essentially of water and:

(A) at least one dissolved alkali or alkaline earth metal hydroxide; and (B) a composition of matter according to claim 3.

13. A liquid paint stripping composition according to claim 12, consisting essentially of water and:

(A) at least one dissolved alkali or alkaline earth metal hydroxide;

(B) a composition of matter according to claim 3; and (C) a component selected from the group consisting of gluconic acid, water soluble and water dispersible salts of gluconic acid, heptogluconic acid and its water soluble and water dispersible salts, and glucono-delta-lactone.

14. A liquid paint stripping composition according to claim 13, consisting essentially of water and:
(A) from about 0.1 to about 10 M/kg of total liquid paint stripping composition of dissolved alkali metal hydroxide selected from the group consisting of sodium, potassium, rubidium, and cesium hydroxides and mixtures thereof;
(B) from about 3 to about 30 percent of total liquid paint stripping composition of component (B); and
(C) from about 0.03 to about 2.0 M/kg of total liquid paint stripping composition of a component selected from the group consisting of gluconic acid, water soluble and water dispersible salts of gluconic acid, heptogluconic acid and its water soluble and water dispersible salts, and glucono-delta-lactone; and, optionally, one or more of the following components:
(D) surfactant; and
(E) alkaline salts exclusive of alkali metal and alkaline earth metal hydroxides.

15. A liquid paint stripping composition according to claim 14, consisting essentially of water and:
(A) from about 0.5 to about 5 M/kg of total liquid paint stripping composition of dissolved alkali metal hydroxide selected from the group consisting of sodium, potassium, rubidium, and cesium hydroxides and mixtures thereof;
(B) from about 5 to about 25 percent of total liquid paint stripping composition of component (B); end
(C) from about 0.07 to about 0.8 M/kg of total liquid paint stripping composition of a component selected from the group consisting of gluconic acid, water soluble and water dispersible salts of gluconic acid, heptogluconic acid and its water soluble and water dispersible salts, and glucono-delta-lactone; and, optionally, one or more of the following components:
(D) surfactant; and
(E) alkaline salts exclusive of alkali metal and alkaline earth metal hydroxides.

16. A liquid paint stripping composition according to claim 15, consisting essentially of water and:
(A) from about 1.1 to about 4.5 M/kg of the total liquid paint stripping composition of dissolved alkali metal hydroxide selected from the group consisting of sodium and potassium hydroxides and mixtures thereof;
(B) from about 9 to about 18 percent of the total liquid paint stripping composition of component (B); and
(C) from about 0.15 to about 0.45 M/kg of total liquid paint stripping composition of a component selected from the group consisting of gluconic acid and water soluble and water dispersible salts of gluconic acid; and, optionally, one or more of the following components:
(D) surfactant; and
(E) alkaline salts exclusive of alkali metal and alkaline earth metal hydroxides.

17. A liquid paint stripping composition consisting essentially of water and:
(A) at least one dissolved alkali or alkaline earth metal hydroxide; and
(B) a composition of matter according to claim 2.

18. A liquid paint stripping composition according to claim 17, consisting essentially of water and:
(A) from about 0.1 to about 10 M/kg of total liquid paint stripping composition of dissolved alkali metal hydroxide selected from the group consisting of sodium, potassium, rubidium, and cesium hydroxides and mixtures thereof;
(B) from about 3 to about 30 percent ol total liquid paint stripping composition of component (B); and
(C) from about 0.03 to about 2.0 M/kg of total liquid paint stripping composition of a component selected from the group consisting of gluconic acid, water soluble and water dispersible salts of gluconic acid, heptogluconic acid and its water soluble and water dispersible salts, and glucono-delta-lactone; and, optionally, one or more of the following components:
(D) surfactant; and
(E) alkaline salts exclusive of alkali metal and alkaline earth metal hydroxides.

19. A liquid paint stripping composition consisting essentially of water and:
(A) at least one dissolved alkali or alkaline earth metal hydroxide; and
(B) a composition of matter according to claim 1.

20. A liquid paint stripping composition according to claim 19, consisting essentially of water and:
(A) from about 0.1 to about 10 M/kg of total liquid paint stripping composition of dissolved alkali metal hydroxide selected from the group consisting of sodium, potassium, rubidium, and cesium hydroxides and mixtures thereof;
(B) from about 3 to about 30 percent of total liquid paint stripping composition of component (B); and
(c) from about 0.03 to about 2.0 M/kg of total liquid paint stripping composition of a component selected from the group consisting of gluconic acid, water soluble and water dispersible salts of gluconic acid, heptogluconic acid and its water soluble and water dispersible salts, and glucono-delta-lactone; and, optionally, one or more of the following components:
(D) surfactant; and
(E) alkaline salts exclusive of alkali metal and alkaline earth metal hydroxides.

* * * * *